United States Patent

Shirahama et al.

[11] Patent Number: 5,262,935
[45] Date of Patent: Nov. 16, 1993

[54] PARALLEL INVERTER CONTROL APPARATUS

[75] Inventors: Hidefumi Shirahama; Ikuo Yamato; Yoshimi Sakurai; Norikazu Tokunaga, all of Hitachi, Japan

[73] Assignee: Hitachi, Ltd., Tokyo, Japan

[21] Appl. No.: 795,739

[22] Filed: Nov. 21, 1991

[30] Foreign Application Priority Data

Nov. 21, 1990 [JP] Japan .................. 2-316756

[51] Int. Cl.$^5$ .......................... H02M 7/5387
[52] U.S. Cl. ........................ 363/71; 363/37; 363/98
[58] Field of Search ............ 363/34, 36, 37, 65, 363/71, 72, 95, 98, 132

[56] References Cited

U.S. PATENT DOCUMENTS

| | | | |
|---|---|---|---|
| 3,614,461 | 10/1971 | Speer | 363/34 |
| 3,665,495 | 5/1972 | Carter et al. | 307/67 |
| 3,768,001 | 10/1973 | Thorberg | 363/71 |
| 4,307,442 | 12/1981 | Yano et al. | 363/37 |
| 4,441,064 | 4/1984 | Cutler et al. | 363/72 |
| 4,555,750 | 11/1985 | Matsumura et al. | 363/37 |
| 4,680,692 | 7/1987 | Sakai | 363/37 |
| 4,727,467 | 2/1988 | Bendl et al. | 363/35 |
| 4,797,799 | 1/1989 | Inokuchi et al. | 363/37 |
| 4,905,134 | 2/1990 | Recker et al. | 363/98 |
| 5,047,909 | 9/1991 | Hosoda | 363/71 |
| 5,191,519 | 3/1993 | Kawakami | 363/71 |

FOREIGN PATENT DOCUMENTS 1-255475 10/1989 Japan .

OTHER PUBLICATIONS

"The Power Converter of Semiconductor"; pp. 216 & 217; Mar. 1987; The Institute of Electrical Engineers of Japan.

Primary Examiner—J. L. Sterrett
Attorney, Agent, or Firm—Antonelli, Terry, Stout & Kraus

[57] ABSTRACT

A structure is disclosed in which instantaneous phase and voltage difference values between the output voltage waveform from an inverter and the output voltage waveform from another AC power source are detected to correct the phase and the level of the output voltage waveform from the inverter so that the phase difference and the voltage difference can be controlled at high speed. As a result, excess current, which occurs if the inverter is operated at high frequencies, can be effectively controlled so that a stable parallel operation of the inverter with another AC power source is possible to perform.

13 Claims, 13 Drawing Sheets

PARALLEL INVERTER CONTROL APPARATUS

BACKGROUND OF THE INVENTION

1. Field of the Invention

The present invention relates to a parallel operation inverter apparatus, and, more particularly, to a parallel operation inverter apparatus capable of, in parallel, operating an inverter, which performs a switching operation at a high frequency, and another AC power source, and an operating method therefor.

2. DESCRIPTION OF THE PRIOR ART

A conventional parallel operation system for an inverter has been arranged as disclosed in "The Power Converter of Semiconductor" (p.p. 216 to 217, March 1987; The Institute of Electrical Engineers of Japan) such that the time average of the active power and the reactive power which circulate between the inverter and another AC power source is detected to use it to control the phase and the level of the output voltage from the inverter so as to make the above-described active power and the reactive power approximate to zero. The power detection method thus-constituted involves a detection time delay of several tens of ms due to its principle. However, since the conventional inverter having a sufficiently high switching frequency displays a satisfactorily large impedance of the output filter, the excess electric current of the inverter can be controlled even if the execution of the control of the output voltage from, the inverter is delayed due to the delay time which has takes place in the power detection. Therefore, a stable parallel operation can be performed.

However, with progress of the semiconductor devices for use in a power source, there has been a desire to reduce the size of the inverter by raising its switching frequency. Therefore, the impedance of its output filter has been reduced recently. As a result, in a case where an inverter which performs the switching operation at a frequency of 10 kHz or higher is operated in parallel with another AC power source, a problem takes place in that an excess electric current undesirably passes through the inverter due to a slight difference in their output voltage levels. Therefore, the above-described method in which the phase and the level of the output voltage are controlled after the average of the above-described active power and the like has been detected cannot be employed.

SUMMARY OF THE INVENTION

An object of the present invention is to provide an parallel inverter operation method capable of, in parallel, operating an inverter, which performs a switching operation at a high frequency, and another AC power source, and a parallel operation inverter apparatus which uses the same.

In order to achieve the above-described object, the inverter parallel inverter operation method according to the present invention is basically arranged in such a manner that the instantaneous values of the phase and the level of the output from the inverter and the instantaneous values of the phase and the level of the other AC power source are detected to obtain the difference between the detected phases and that between the detected levels. Furthermore, at least the phase and the level of the output from the inverter are controlled. In a case where there is no difference between the level of the output voltage from the inverter and that from the other AC power source, the phase of the output voltage from the inverter may be controlled so as to make the phase difference to be zero or a value near zero after only the phase difference has been detected. On the contrary, if there is no difference in the phase, the output voltage from the inverter may be controlled so as to make the difference to be zero or a value near zero after only the output voltage difference has been detected.

In a case where the other AC power source is an inverter, the phase and/or the level of the output from the above-described inverter may be controlled so as to make the phase difference and/or the level difference between the detected values to be zero or a value near zero. In this case, the phases and the levels from the outputs from parallel inverters can quickly be made to coincide with each other.

The output to be detected may be selected from any one of the output voltage, the output current and the output power. Furthermore, another structure may be employed in which: before the start of the parallel operation, an instantaneous value of an output voltage from the inverter and an instantaneous value of an output voltage from another AC power source are detected; at least either the phase difference or the level difference of the detected values are detected; and at least either of the phase and the level of the output voltage of at least the inverter are controlled. After the parallel operation has been started, at least the phase and the level of the output voltage from at least the inverter are controlled so as to make the phase difference and the level difference of the output current to be zero or a value near zero as an alternative to the output voltage.

The above-described phase difference and the level difference can be obtained in accordance with biaxial co-ordinates component vectors obtained by converting the output from the inverter and that from the other AC power source.

The parallel operation inverter apparatus according to the present invention includes an inverter, the output terminal of which is connected in parallel to at least another AC power source, and a controller for controlling the parallel operation of the inverter, the inverter parallel operation apparatus comprising: first detection means for detecting an instantaneous value of a physical quantity which includes phase information and level information of the output from the inverter; second detection means for detecting an instantaneous value of a physical quantity which includes phase information and level information of the output from the AC power source; a comparator for obtaining at least the phase difference of the output and the level difference of the same from the detected value; and correction means for correcting command values which correspond to at least the phase and the level of the output from the inverter so as to make the obtained difference to be zero or a value near zero.

In addition to the controller for performing the parallel operation of the parallel operation inverter apparatus, a first biaxial co-ordinates converter for converting the detected instantaneous value detected by the first detection means into an orthogonal biaxial co-ordinates component and a second biaxial co-ordinates converter for converting the detected instantaneous value detected by the second detection means into an orthogonal biaxial co-ordinates component are provided. Furthermore, the comparator obtains the difference between the biaxial co-ordinates components transmitted from the first and second biaxial co-ordinates converters and further obtains at least either of the phase difference or the level difference of the outputs in accordance with the obtained difference.

Since the structure is constituted as described above, the object of the present invention can be achieved by the following operation:

The instantaneous phase difference and the instantaneous level difference of the output voltage, the output current and the output power of the inverter and the other AC power source to be parallel-operated can be reduced. As a result, even if the impedance of the output filter is made to be small due to raising of the switching frequency of the inverter, the electric current which passes between the inverter and the other AC power source can be minimized due to the difference in the phase difference or the level difference involved in the outputs from the two parallel power sources.

Other and further objects, features and advantages of the invention will be appear more fully from the following description.

DESCRIPTION OF THE PREFERRED EMBODIMENTS

A first embodiment of the present invention will now be described with reference to FIGS. 1 to 10.

Figure 1:
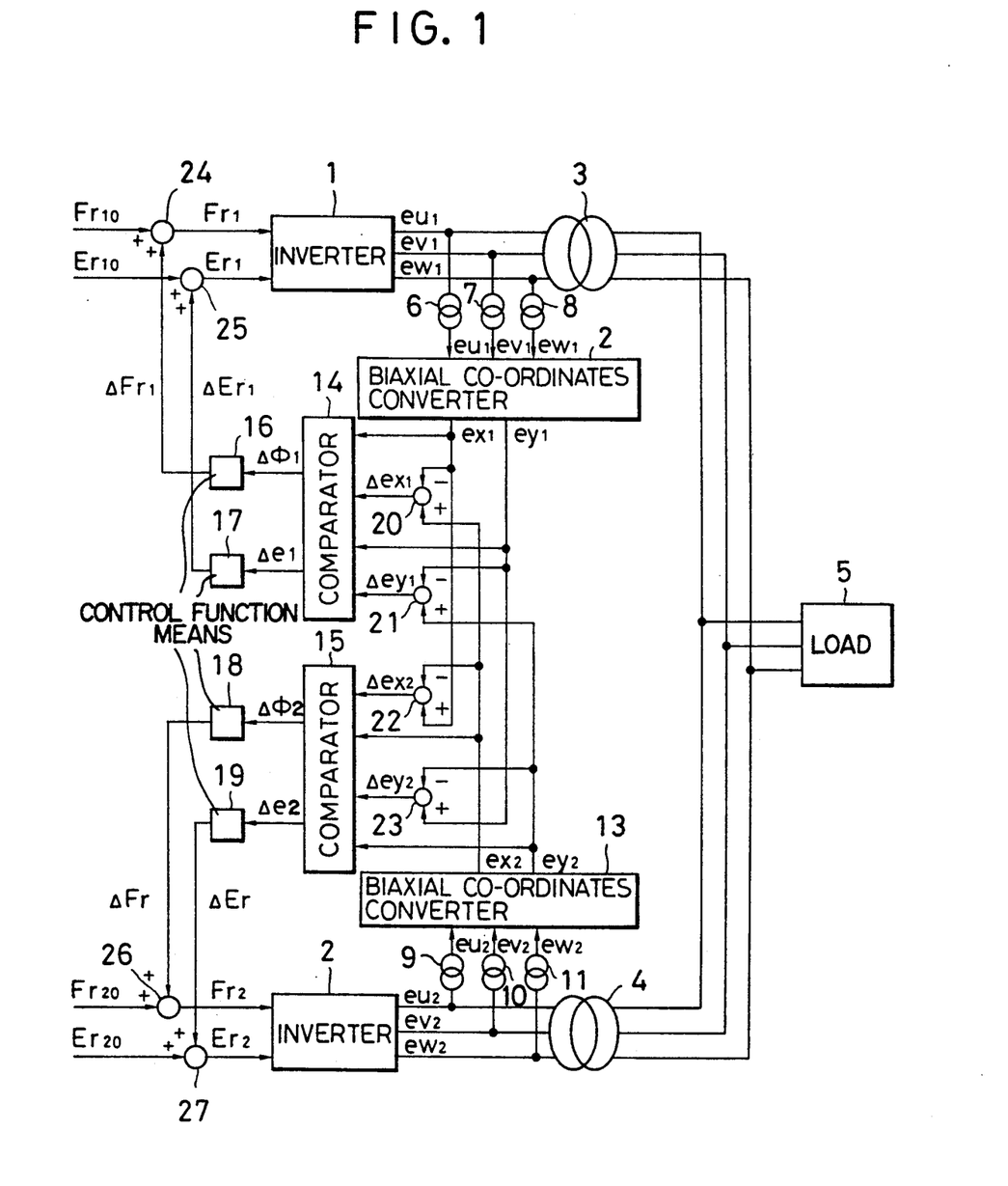
FIG. 1 is an overall structural view which illustrates an embodiment of a parallel operation inverter apparatus according to the present invention.

FIG. 1 is an overall structural view which illustrates a first embodiment of the present invention in which two inverters 1 and 2 are operated in parallel. As shown in FIG. 1, each of the inverters 1 and 2 transmits three-phase AC power, the frequency and the voltage of which correspond to frequency commands $Fr_1$ and $Fr_2$ and voltage commands $Er_1$ and $Er_2$. The transmitted output power of each inverter as described above is supplied to a load 5 via corresponding transformers 3 and 4. Instantaneous values $eu_1$, $ev_1$ and $ew_1$ of the output voltage from each of the inverters 1 and 2 are detected by voltage detectors 6 to 11 before they are supplied to biaxial co-ordinates converters 12 and 13. Orthogonal vectors $edx_1$, $edy_1$ and $edx_2$ and $edy_2$ converted by the above-described biaxial co-ordinates converters 12 and 13 are respectively supplied to comparators 14 and 15. The above-described comparators 14 and 15 respectively receive the difference in the corresponding orthogonal vectors obtained by adders 20 to 23. In the comparators 14 and 15, phase differences $\Delta\phi_1$ and $\Delta\phi_2$ between ouput voltage from difference $\Delta e_1$ and $\Delta e_2$ are obtained before they are supplied to adders 24 to 27 for correcting frequency commands $Fr_{10}$ and $Fr_{20}$ and voltage commands $Er_{10}$ and $Er_{20}$ via control function means 16 to 19.

Figure 2:
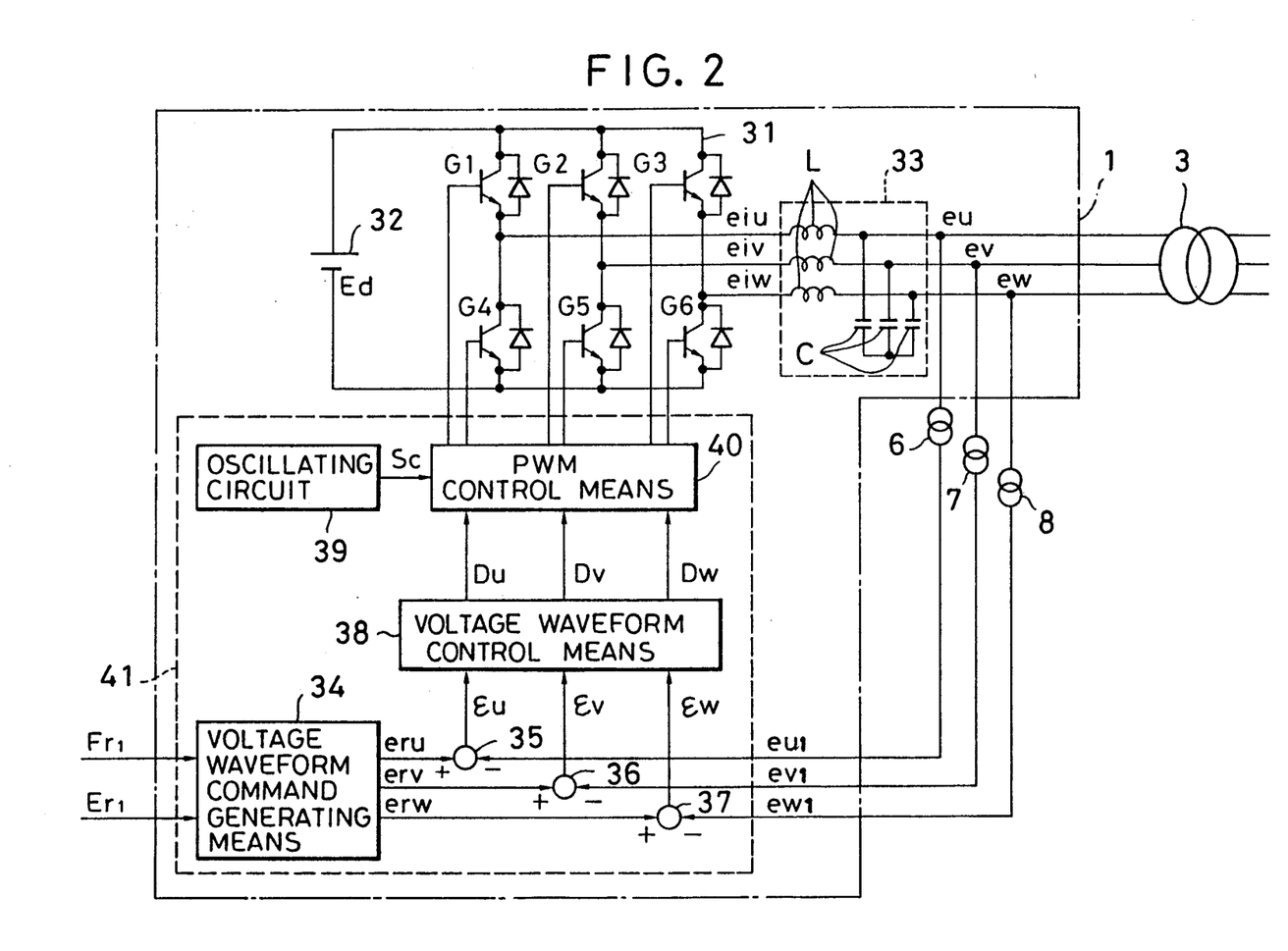
FIG. 2 is detailed structural view which illustrates an inverter.

The structure and the operation of the inverter 1 will now be described with reference to FIGS. 2 to 5. FIG. 2 illustrates the internal structure of the inverter 1 for transmitting the three-phase AC voltage the frequency of which corresponds to the frequency command $Fr_2$ and the voltage value of which corresponds to the voltage command $Er_1$. The main circuit of the inverter 1 comprises an inverter means 31 composed of bridge-connected switching devices $G_1$ to $G_6$, a DC voltage source 32 and an output filter 33 consisting of a reactor L and a capacitor C. The inverter 1 has a control means comprising voltage detectors 6, 7 and 8, voltage waveform command generating means 34, adders 35 to 37, voltage waveform control means 38, an oscillating circuit 39 and a PWM control means 40.

Figure 3:
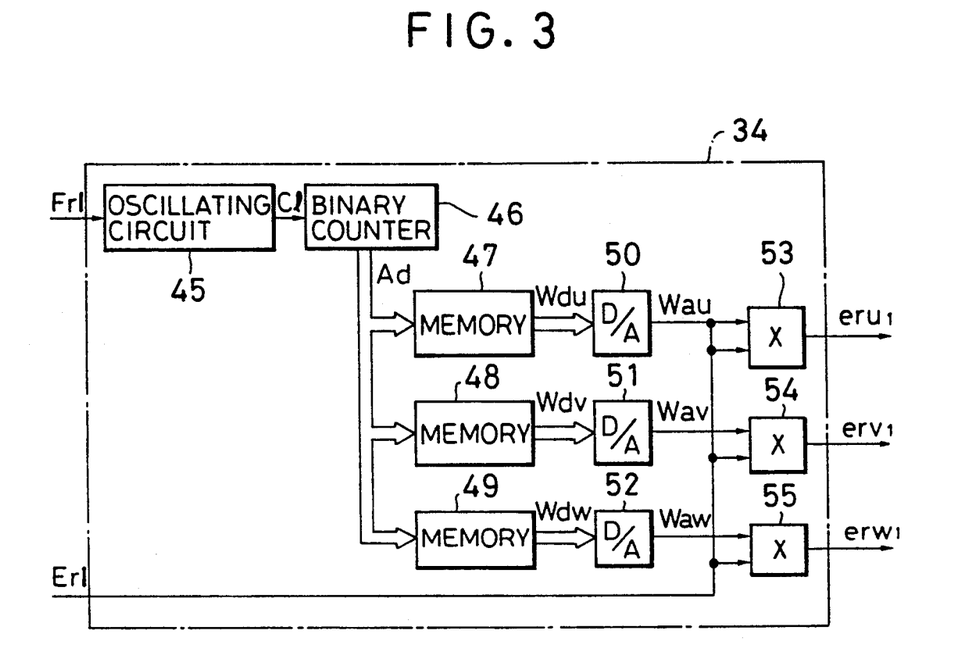
FIG. 3 is a detailed structural view which illustrates a voltage waveform command generating means.
Figure 4:
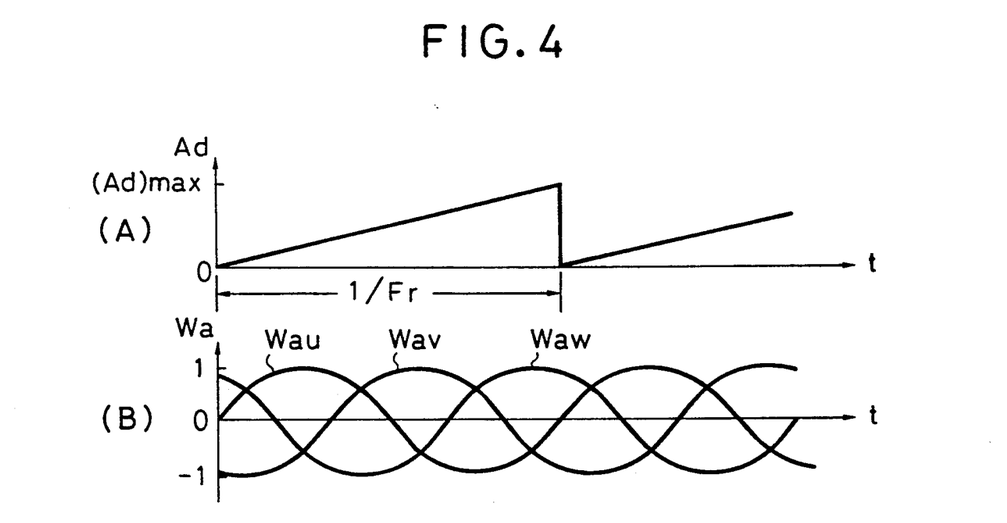
FIG. 4 is a view which illustrates the operation of a voltage waveform command generating means.
Figure 5:
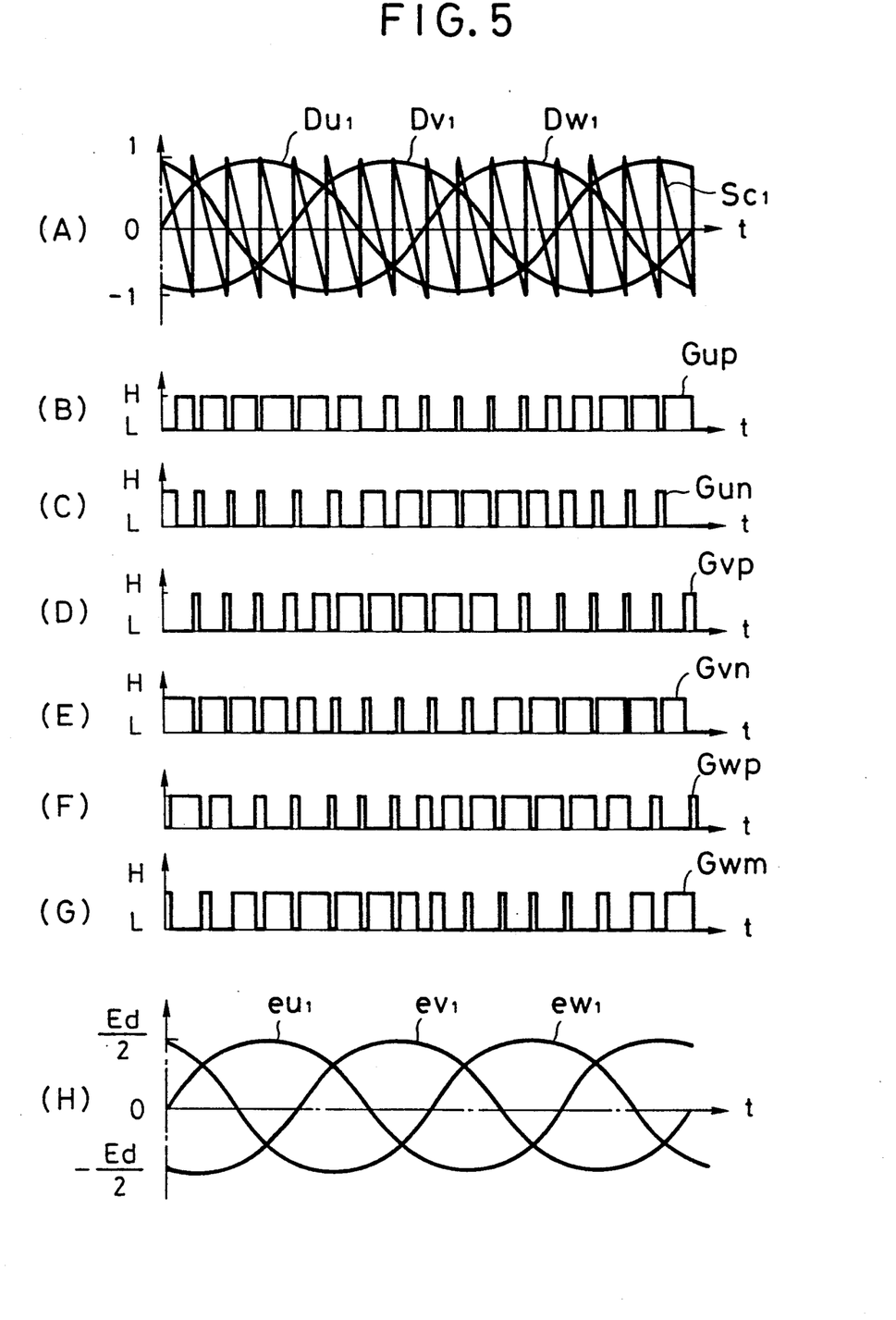
FIG. 5 illustrates each waveform of the inverter.
Figure 6:
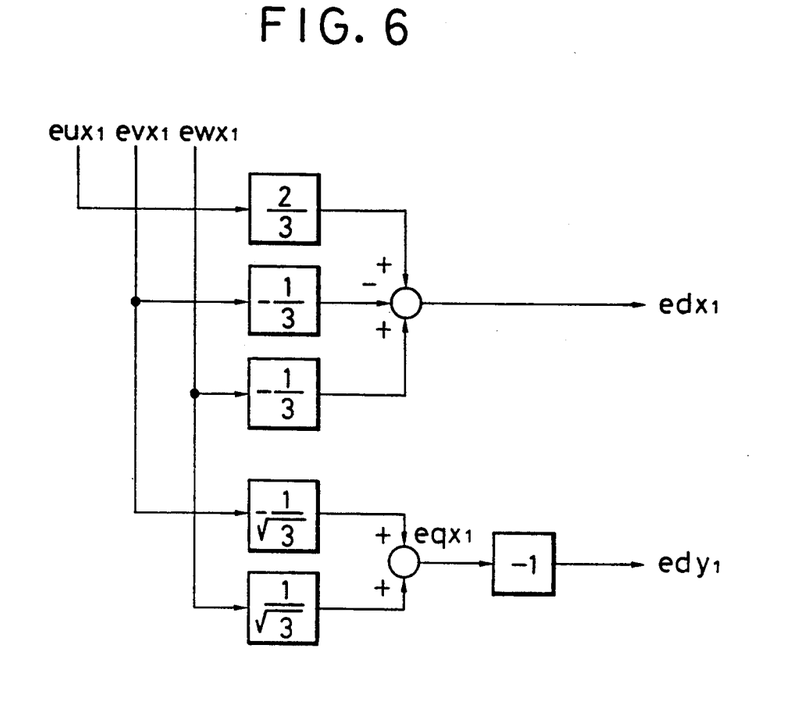
FIG. 6 is a block diagram which illustrates a biaxial co-ordinates converter.

FIG. 3 specifically illustrates the voltage waveform command generating means 34 in which an oscillating circuit 45 generates clock signal C1 the frequency of which corresponds to the frequency command $Fr_1$. A binary counter 46 counts the clock signal C1 to generate address signal Ad which is changed at a period $(1/Fr_1)$ shown in FIG. 4A. The address signal Ad corresponds to the phase of the output voltage. Memories 47 to 49, in response to the address signal Ad, transmit three-phase voltage waveform signals Wdu, Wdv and Wdw which have been previously stored therein. The above-described waveform signals are converted by DA converters 50 to 52 into analog signals Wau, Wav and Waw as shown in FIG. 4B. The analog signals Wau, Wav and Waw formed by the conversion are, by multipliers 53 to 55, amplified to $Er_1$, which is the voltage command, times before they are transmitted as three-phase voltage waveform commands $eru_1$, $erv_1$ and $erw_1$. Referring back to FIG. 2, differences $\epsilon u_1$, $\epsilon v_1$ and $\epsilon w_1$ between the three-phase voltage waveform commands $eru_1$, $erv_1$ and $erw_1$ and the three-phase voltage waveform detected values $eu_1$, $ev_1$ and $ew1$ detected by the voltage detectors 6 to 8 are obtained by adders 35 to 37. The voltage waveform control means 38 processes duty commands $Du_1$, $Dv_1$ and $Dw_1$ for making $eu_1$, $ev^1$ and $ew_1$ to be values near zero. The PWM control means 40 processes gate pulses Gup, Gun, Gvp, Gvn, Gwp and Gwn as illustrated by subjecting sawtooh wave signal $Sc_1$ generated by the oscillating circuit 39 and the duty commands $Du_1$, $Dv_1$ and $Dw_1$ to comparisons. At this time, three-phase AC voltages $eu_1$, $ev_1$ and $ew_1$ are transmitted to the load 5 via the inverter means 31 and the output filter 33. Similarly to the structure and the operation of the inverter 1, the inverter 2 has a similar structure and performs a similar operation so that it transmits three-phase AC voltages $eu_2$, $ev_2$ and $ew_2$ the frequency of which correspond to the frequency command $Fr_2$ and the voltage value of which corresponds to the voltage command $Er_2$.

In the parallel operation of the inverters performed as described above, the phase and the level of the output voltage waveform from the inverters must be made coincide with each other. Therefore, according to the embodiment shown in FIG. 1, the frequency commands and the voltage commands for the inverters 1 and 2 are arranged to be corrected in accordance with the phase and voltage differences between the inverters. Furthermore, in a case of an inverter having a high switching frequency, the impedance of the output filter 33 is small as described above. Therefore, the phase difference and the voltage difference must quickly be made coincide with each other in order to decrease the electric current passing between the inverters 1 and 2. Therefore, it is a critical factor to obtain the phase difference and the voltage difference at high speed. Then, the principle of detecting the phase difference and the voltage difference according to the present invention will now be described with reference to FIGS. 6 to 10 by using the inverter 1.

Figure 8:
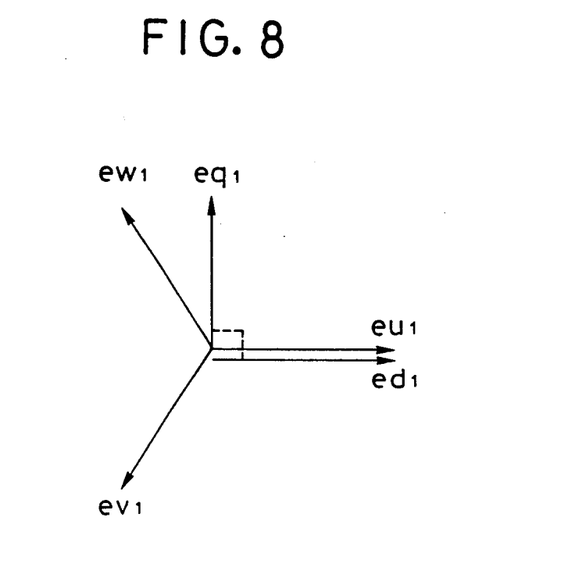
FIG. 8 is a diagram of vectors used in the invention.
Figure 9:
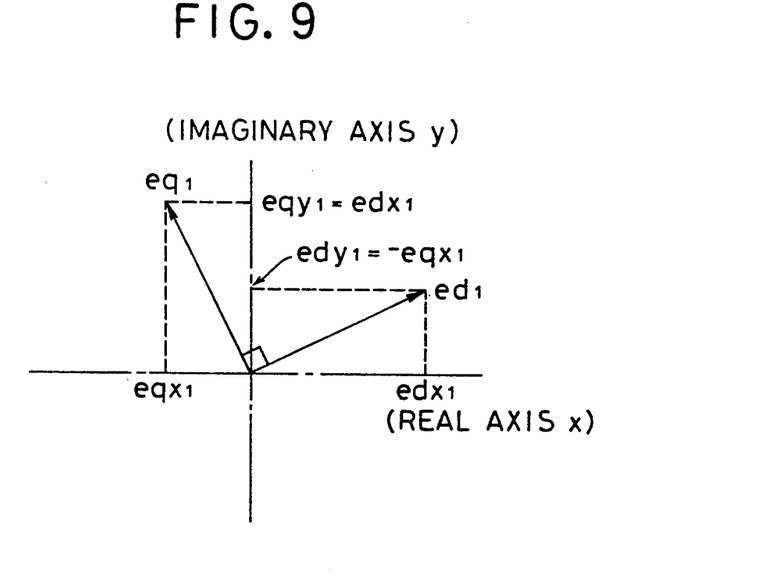
FIG. 9 illustrates the principle of biaxial coordinates conversion and a way of obtaining the phase difference and the voltage difference.

The biaxial co-ordinates converter 12 shown in FIG. 1 obtains real axis coordinates $edx_1$ and $eqx_1$ of orthogonal vectors $ed_1$ and $eq_1$ from real axis coordinate values $eux_1$, $evx_1$ and $ewx_1$ of the voltage vectors $eu_1$, $ev_1$ and $ew_1$ shown in FIG. 8 in accordance with the following equation:

$$edx_1 = \tfrac{2}{3}eux_1 - \tfrac{1}{3}exx_1 - \tfrac{1}{3}ewx_1$$

$$eqx1 = -1/\sqrt{3}\, evx1 + 1/\sqrt{3}\, ewx1$$

Figure 10:
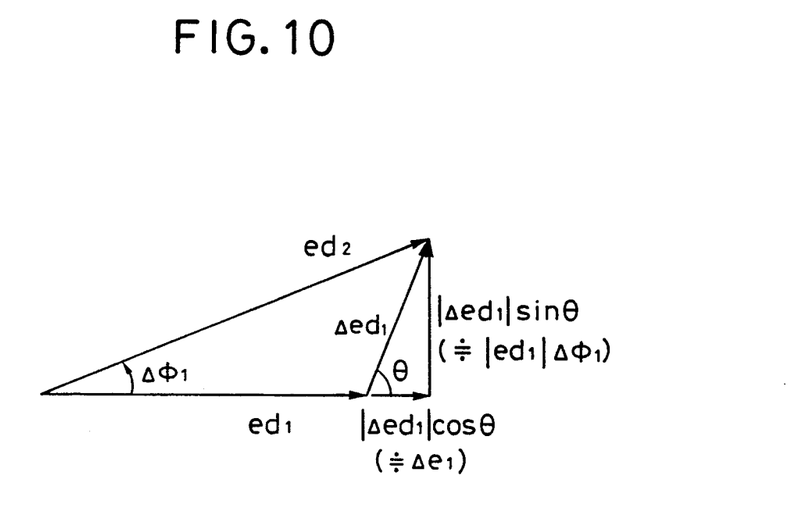
FIG. 10 illustrates the principle of a biaxial co-ordinates conversion and a way of obtaining the phase difference and the voltage difference.

Although the orthogonal vectors $ed_1$ and $eq_1$ rotate with time, imaginary axis coordinate values $edy_1$ and $eqy_1$ for the above-described vectors can be obtained from the detectable real axis coordinate values $edx_1$ and $eqx_1$ because the above-described orthogonal vectors $ed_1$ and $eq_1$ are perpendicular to each other. That is, the imaginary axis coordinate value $edy_1$ of the vector $ed_1$ can be obtained by ($-eqx_1$). Therefore, the real axis coordinate value $edx_1$ and the imaginary axis coordinate value $edy_1$ of the vector $ed_1$ can be obtained from the process shown in a block diagram shown in FIG. 6. Also biaxial co-ordinates converter 13 obtains real axis coordiante value $edx_2$ and imaginary axis coordinate value $edy_2$ of the vector $ed_2$ for the inverter 2 by the similar operation. Assuming that the output voltage waveforms from the inverters 1 and 2 involve the phase difference and the voltage difference and as well as the vectors $ed_1$ and $ed_2$ hold the relationship as shown in FIG. 10, it can be said that there is error vector $\Delta ed_1$.

Figure 7:
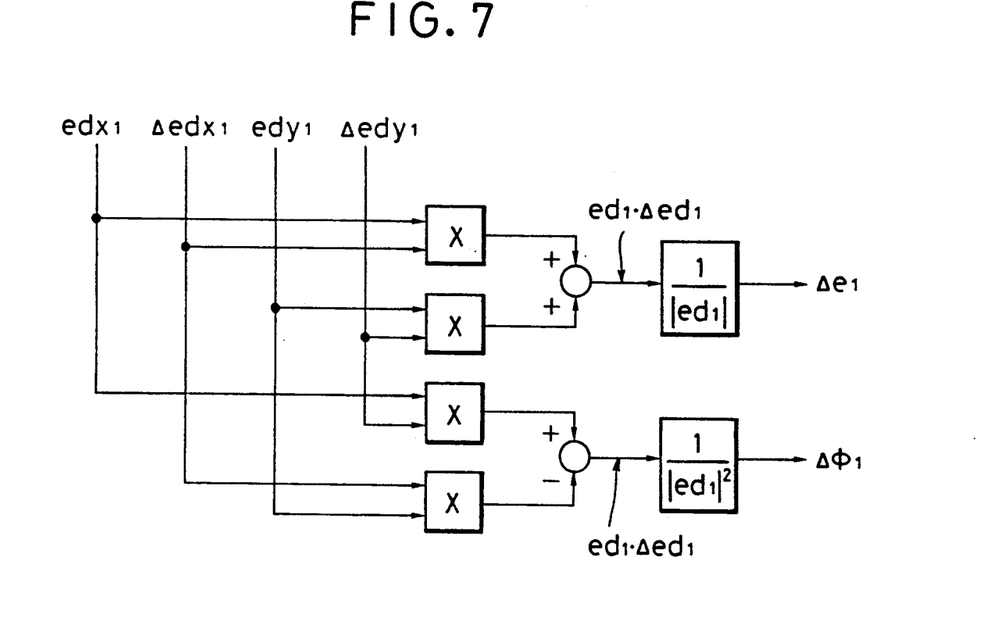
FIG. 7 is a block diagram which illustrates a comparator.

When the above-described error vector $\Delta ed_1$ is, as illustrated, separated into component $|\Delta ed_1|\cos\theta$ which is in parallel to the vector $ed_1$ and component $|\Delta ed_1|\sin\theta$ which is in parallel to the vector $ed_1$ and component $|\Delta ed_1|\sin\theta$ which is perpendicular to the same, the phase differenc $\Delta\phi_1$ and the voltage difference $\Delta e_1$ for the inverter 1 from the inverter 2 can be obtained. The above-described operations are performed by the adders 20 and 21 and the comparator 14 for obtaining the phase difference and the voltage difference. The function of the comparator 14 can be expressed in a block diagram shown in FIG. 7, where the level $|ed_1|$ of the vector $ed_1$ is determiend by the following equation:

$$|ed1| = \sqrt{edx1 \cdot edx1 + edy1 \cdot edy1}$$

When the phase difference $\Delta\phi_1$ and the voltage difference $\Delta e_1$ are obtained, control functions 16 and 17 for processing frequency correction quantity $\Delta Fr_1$ and voltage correction quantity $\Delta Er_1$ and which cause $\Delta\phi_1$ and $\Delta e_1$ to approach zero may be set. The control function for correcting the frequency operates in an integral manner due to a control loop, only a gain may be used. On the other hand, the control function for correcting the voltage is arranged to include the integral element in order to reduce the erroneous difference, preferably a first order lag. Furthermore, it is preferable that a leading element be added in order to raise the response speed.

According to the first embodiment shown in FIG. 1, also the inverter 2 is subjected to the above-described process. According to the first embodiment, a parallel operation in which the phase difference and the voltage difference at an instantaneous moment between the inverter 1 and the inverter 2 are quickly made coincide with each other can be performed. However, a structure may be employed which is arranged in such a manner that the frequency command and the voltage command of either inverter are corrected in accordance with the detected phase difference and the voltage difference. In this case, a similar effect can be obtained. Furthermore, the correction may be performed in accordance with only the phase difference in a case where the voltage levels of the two inverters are substantially the same. On the contrary, if the phase difference is substantially the same, a similar effect can be obtained by performing the correction in accordance with only the voltage difference.

According to the embodiment shown in FIG. 1, the comparators 14 and 15 are respectively provided for the two inverters 1 and 2 so as to make the structures of the two inverters to be the same. However, since the phase difference and the voltage difference are relative factors, $\Delta\phi_1$ and $\Delta 100_2$ and as well as $\Delta e_2$ are respectively different from each other in only their polarities. Therefore, either of the two comparators 14 and 15 may be omitted from the structure.

According to the embodiment shown in FIG. 1, the phase difference and the like are detected in accordance with the output voltage from the inverter. As an alternative to this, the phase difference or the like may be detected in accordance with the internal voltage of the inverter, that is, $eiu_1$, $eiv_1$ and $eiw_1$ shown in FIG. 2. In this case, a similar effect can be obtained. Since the above-described internal voltage include higher harmonic wave, it is effective to employed a method arranged in such a manner that the internal voltages $eiu_1$, $eiv_1$ and $eiw_1$ is indirectly obtained by multiplying the duty commands $Du_1$, $Dv_1$ and $Dw_1$ with the with the DC voltage value Ed.

Figure 11:
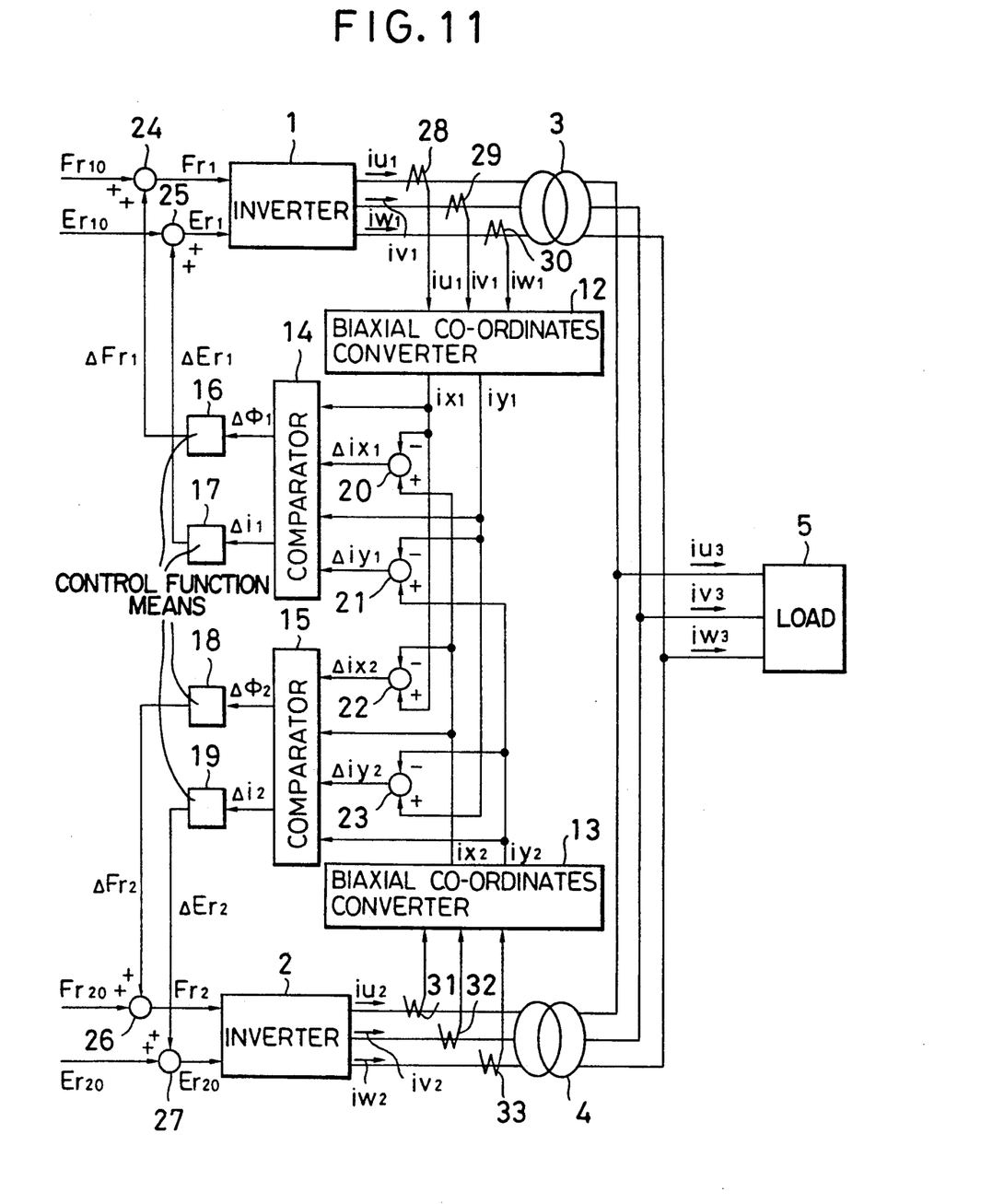
FIG. 11 is an overall structural view which illustrates another embodiment of the present invention.
Figure 12:
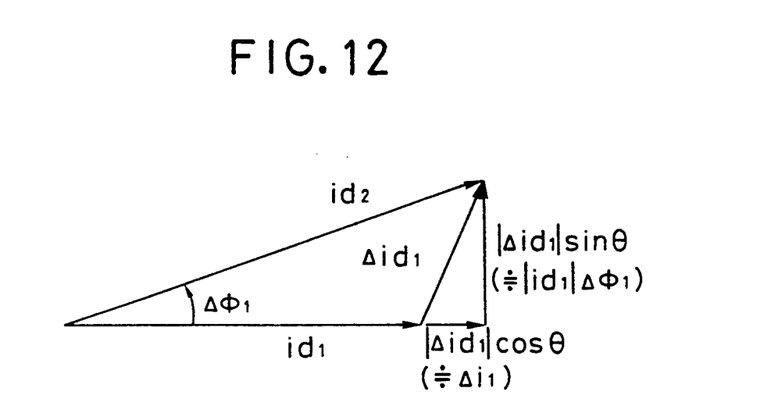
FIG. 12 is a vector chart which illustrates the operation of a second embodiment.

Then, another embodiment of the present invention will now be described with reference to FIGS. 11 to 18. FIG. 11 illustrates a structure for performing the parallel operation control in such a manner that output currents from the inverters 1 and 2 are detected as an alternative to the detection of the output voltages according to the embodiment shown in FIG. 1, and the instantaneous phase difference and the current difference are obtained in accordance with the detected output currents. The structure and the function of the parallel operational system are the same as those according to the embodiment shown in FIG. 1 except for the arrangement made such that the voltage, which is the subject controlled variable, is replaced by the current. The electric current vector according to this embodiment is as shown in FIG. 12 and the same is similar to that shown in FIG. 10.

Figure 13:
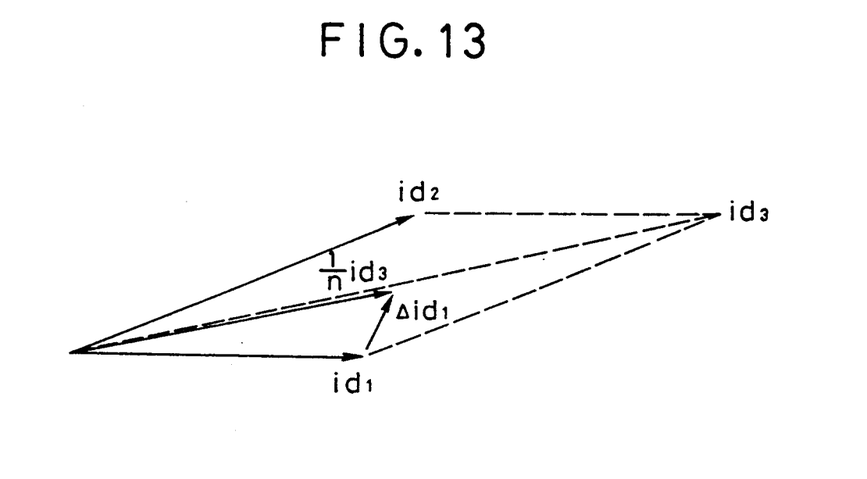
FIG. 13 is a vector chart which illustrates the operation of a second embodiment.

Assuming that the subject of the comparison of the phase and the level of the current is, as shown in FIG. 13, 1/n of vector $id_3$ for the electric current passing through the load 5 shown in FIG. 1, the current share between the inverters can be arbitrarily set by changing the value of n. Furthermore, three or more inverters can easily be operated in parallel.

Furthermore, by employing both the method shown in FIG. 1 in which the voltage vector is used and the method according to this embodiment in which the electric current is used, the parallel operation system can be improved to operate even faster and more accurately. As an alternative to the voltage vector or the electric current vector, electric an power vector which is the mixture of the voltage vector and the electric current vector may be used to perform the parallel operation.

Figure 14:
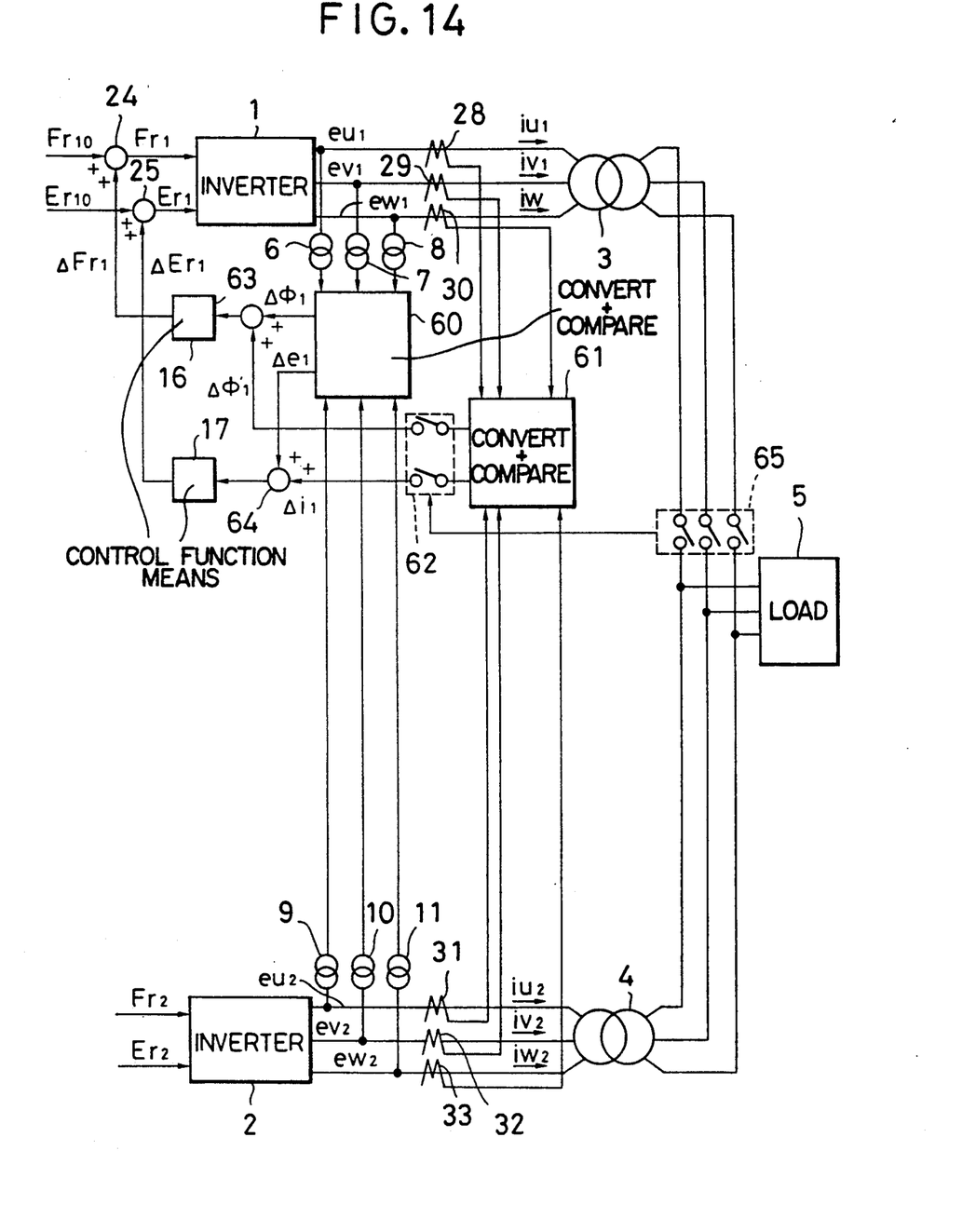
FIG. 14 is an overall structural view which illustrates another embodiment of the parallel inverter apparatus according to the present invention.

FIG. 14 is an overall structural view which illustrates an embodiment in which the method according to the voltage vector and the method according to the electric current vector are employed together. Referring to FIG. 14, reference numerals 60 and 61 represent a portion corresponding to the co-ordinate converters 12, 13 and the comparator 14 shown in FIGS. 1 and 11. According to this embodiment, only inverter 1 is subjected to the parallel operation control. The phase difference and the current difference detected in accordance with the electric current are supplied to adders 63 and 64 via a switch 62. In the adders 63 and 64, the above-described phase difference and the electric current difference are respectively added to the phase difference and the electric difference detected in accordance with the voltage The switch 62 is closed when a parallel commencement switch 65 is switched on. Since the structure is constituted as described above, the two inverters 1 and 2 are started before the phases and the voltages of the two inverters are made to coincide with each other in accordance with the output voltage. Then, the parallel commencement switch 65 is switched on to perform the parallel operation. Then, the correction control of the phase and the voltage in accordance with the output current is added. Therefore, the parallel operation can be quickly performed.

Figure 15:
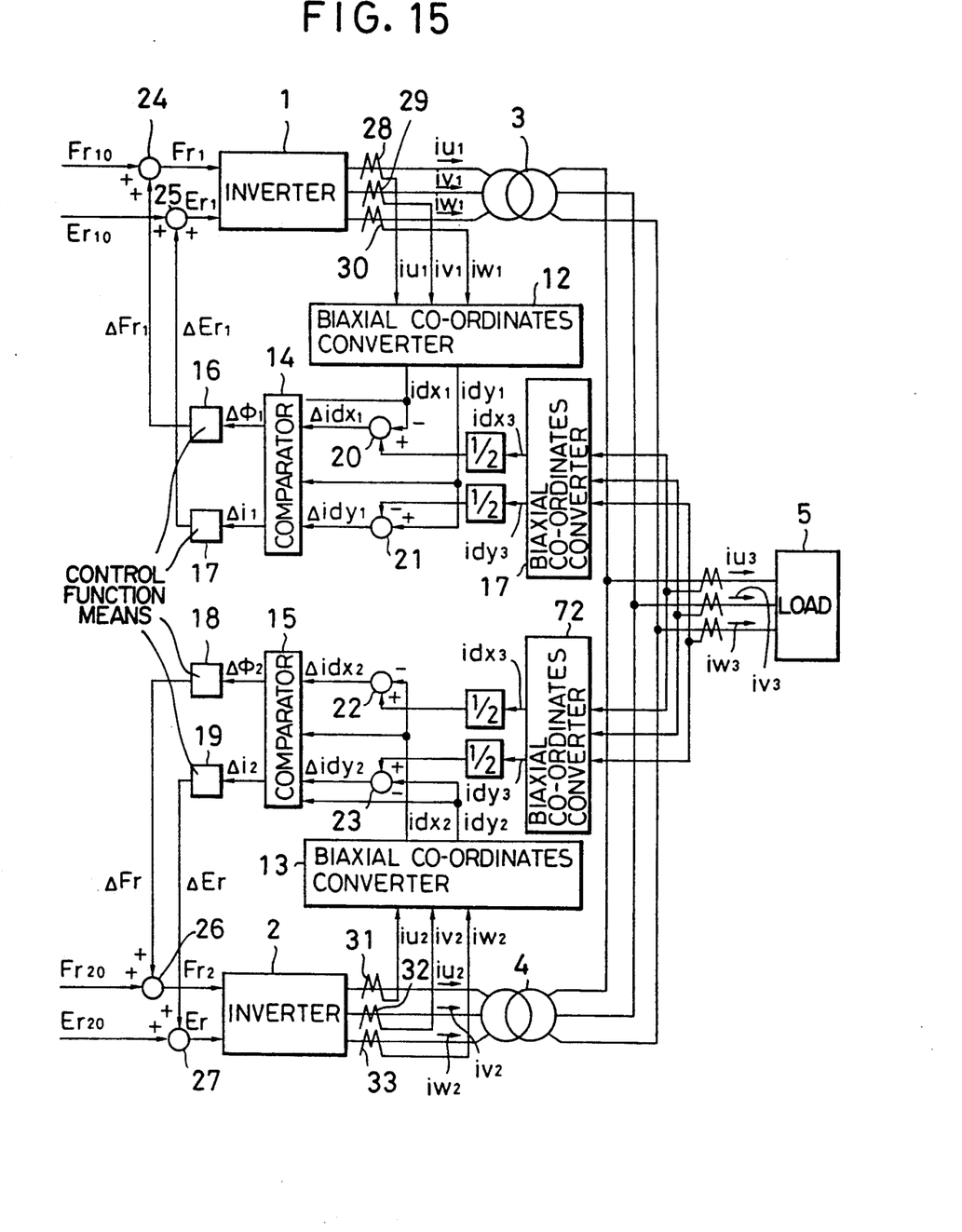
FIG. 15 is an overall structural view which illustrates another embodiment of the parallel inverter apparatus according to the present invention.

FIG. 15 illustrates modification to the embodiment shown in FIG. 11. According to this modification, load currents $iu_3$, $iv_3$ and $iw_3$ are detected so as to be subjected to biaxial co-ordinates conversions in biaxial co-ordinates converters 71 and 72 so that orthogonal vector components are obtained before they are multiplied by the load share ratio ($\frac{1}{2}$). Then, they are supplied to the adders 20 to 23. Although the inverters 1 and 2 have the same capacity in this case, the above-described load share ratio may be changed in a case where they are different from each other.

Figure 16:
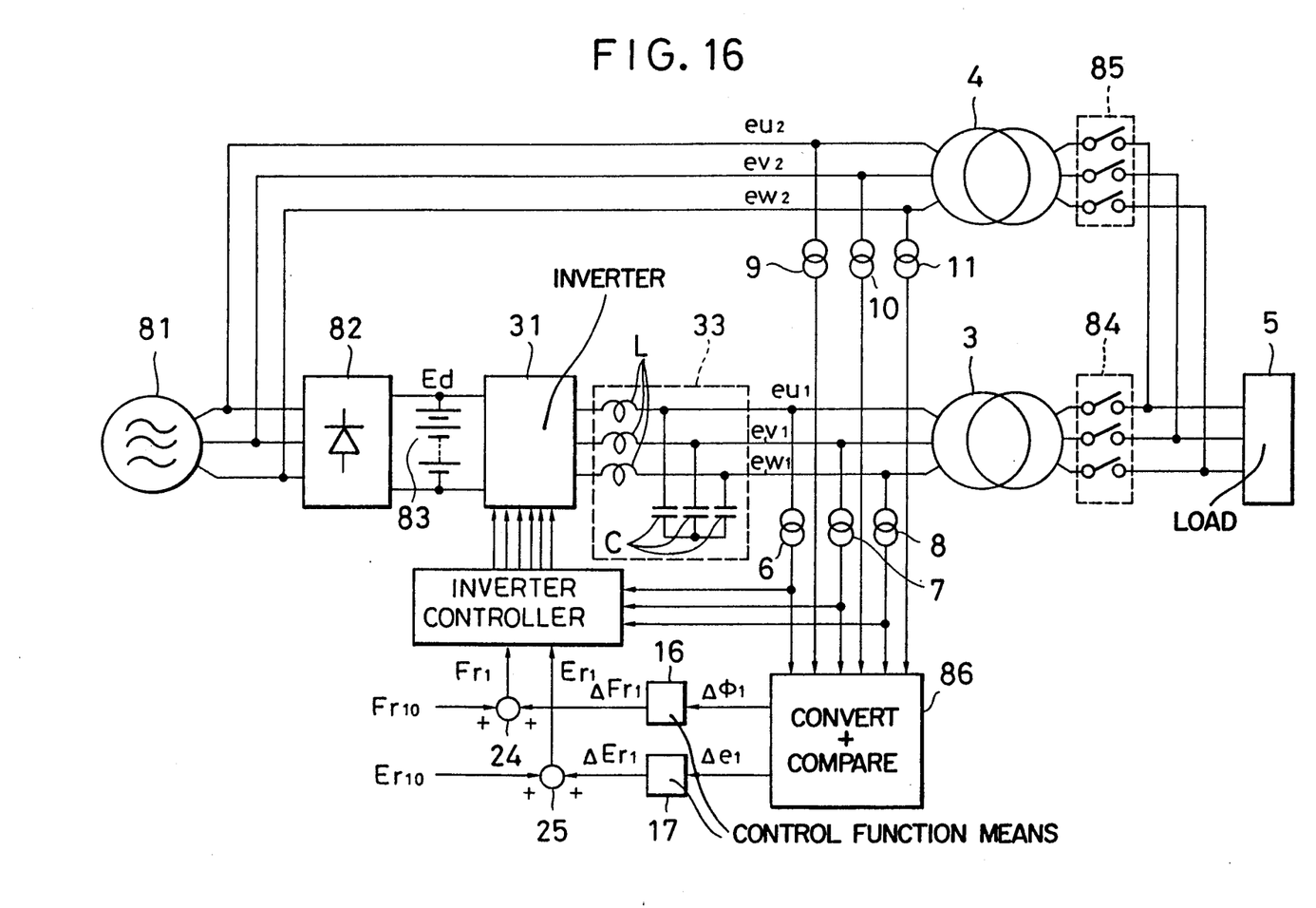
FIG. 16 is an overall structural view which illustrates another embodiment of the parallel inverter apparatus according to the present invention.

FIG. 16 illustrates an embodiment in which the inverter parallel operation method according to the present invention is applied to an uninterruptive power supply system (UPS). As shown in FIG. 16, power for the inverter means 31 is supplied from a battery 83 which is charged with power of a commercial power source 81 after the power has been rectified by a converter 82. The output transmitted from the inverter means 31 can be supplied to the load 5 via the output filter 33, the transformer 3 and a switch 84. On the other hand, the output transmitted from the commercial power source 81 can be supplied to the load 5 via the transformer and a switch 85. Referring to FIG. 16, reference numeral 86 represents a portion corresponding to the co-ordinate converters 12, 13 and the comparator 14. Reference numeral 41 represents the portion given the same reference numerals and shown in FIG. 1.

In the UPS thus-constituted, the battery 83 is charged by the converter 82 in normal condition and the battery 83 is used at the time of power failure. If the inverter means 31 encounters an excessive load in normal condition, the inverter means 31 is protected in such a manner that the switch 85 is closed and the switch 84 is opened to supply the power through a bypass system of the transformer 4 to the load in a power supply uninterruptive manner. The switches 84 and 85 must be switched over by lapping the periods in which the switches are switched on. The above-described parallel operation mode is realized in the above-described period in which the switches are switched on. Therefore, by applying the parallel operation method according to the present invention, the excess current passing through the inverter means 31 at the time of the bypass switch operation can be prevented.

Figure 17:
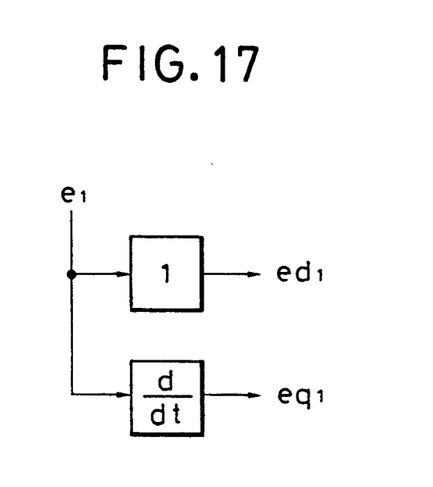
FIG. 17. is a block diagram which illustrates a biaxial co-ordinates converter for a single-phase inverter.
Figure 18:
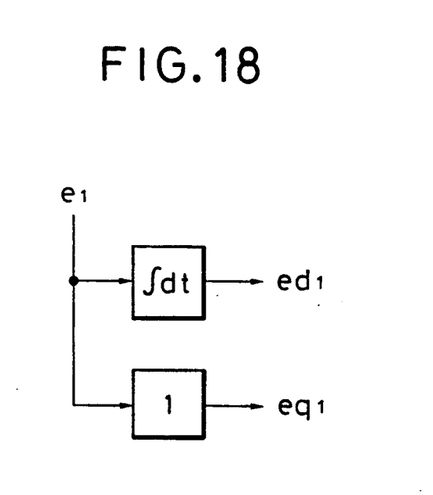
FIG. 18 is a block diagram which illustrates another example of a biaxial co-ordinates converter for a single-phase inverter.

Although the above-described embodiment is structured in such a manner that the three phase inverters are used, the present invention may be applied to the parallel operation of single phase inverters in such a manner that the orthogonal voltage vector is obtained by differentiating or integrating the output voltage as shown in FIG. 17 or 18. The similar method may be as well as employed in a case of an electric current. Thus, the single phase inverters can be parallel-operated.

As described above, according to the present invention, the instantaneous phase difference and the instantaneous level difference of the output voltage, the output current and the output power of the inverter and the other AC power source to be parallel-operated can be reduced. As a result, even if the impedance of the output filter is made to be small due to raising of the switching frequency of the inverter, the electric current which passes between the inverter and the other AC power source can be minimized due to the difference in the phase difference or the level difference involved in the outputs from the two parallel power sources. Therefore, the inverter which performs the switching operation at high frequency and the other AC power source can be parallel operated.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed

We claim:

1. A parallel inverter control method in which electric power is supplied to a load in a such a manner that an output terminal of at least one AC power source is connected to an output terminal of an inverter in parallel, said parallel inverter control method comprising the steps of:
   detecting an instantaneous value of the output voltage from said inverter and an instantaneous value of the output voltage from said AC power source;
   calculating a value of difference between the output voltage detected values of said inverter and said AC power source for the respective corresponding phase;
   calculating a phase difference ($\Delta\phi 1$) of the output voltages between said inverter and said AC power source from a vector product obtained from said respective output voltage detected values and said respective difference value;
   calculating a magnitude difference ($\Delta\theta 0602\ 1$) between the output voltages of said inverter and said AC power source for a scalar product of said respective voltage detected values and said respective difference value; and
   controlling the phase and/or the magnitude of the output voltage of said inverter such that the differences of said phase and/or said magnitude close to zero.

2. A parallel inverter control method according to claim 1, where
   said output voltages from said inverter and from said AC power source are three-phase AC output voltages; and
   said phase difference and said magnitude difference of said output voltage are obtained in accordance with orthogonal biaxial coordinates components obtained by converting said three-phase AC output voltages.

3. A parallel inverter control method according to claim 1, wherein:
   said at least one AC power source is an inverter, for which the phase and/or the magnitude of the output voltage thereof are controlled such that the phase difference of the output voltage and phase difference and/or the magnitude difference of the output voltage closes to zero.

4. A parallel inverter control method for supplying power to a load by connecting in parallel an output terminal of an AC power source and an output terminal of an inverter, comprising the steps of:
   detecting instantaneous values of the output currents of said inverter and said AC power source;
   calculating a difference of the output current detected values between said inverter and said AC power source for the respective corresponding phase;
   calculating a phase difference ($\Delta i\ 1$) of the output currents between said inverter and said AC power source from a vector product of said respective output current detected values and said respective difference value;
   calculating a magnitude difference ($\Delta\phi 1$) of the output currents between said inverter and said AC power source from a scalar product of said respective output current detected values and said respective difference value; and
   controlling the phase and/or magnitude of the output current of said inverter such that the phase difference and/or the magnitude difference close to zero.

5. A parallel inverter control method according to claim 4, wherein:
   said output currents from said inverter and from said AC power source are three-phase output AC currents; and
   said phase difference and said difference of output currents are obtained in accordance with orthogonal biaxial coordinates components obtained by converting said three phase output currents.

6. A parallel inverter control method according to claim 4, wherein:
   said other AC power source is an inverter, for which the phase and/or the magnitude of the output current thereof are controlled such that the phase difference of the output current and phase difference and/or the magnitude difference of the output current close to zero.

7. A parallel inverter control method for supplying a power to a load by connecting in parallel an output terminal of an AC power source and an output terminal of an inverter, comprising the steps of:
   detecting instantaneous values of the output voltage of said inverter and said AC power source;
   calculating a difference of the output voltage detected values between said inventor and said AC power source for the respective corresponding phase;
   calculating a phase difference ($\Delta\phi 1$) of the output voltages between said inverter and said AC power source from a vector product of said respective output voltage detected values and said respective difference value;
   calculating a magnitude difference ($\Delta e_1$) of the output voltages between said inverter and said AC power source from a scalar product of said respective output voltage detected values and said respective difference value;
   detecting instantaneous values of the output currents of said inverter and said Ac power source;
   calculating a difference of the output current detected values between said inverter and said AC power source for the respective corresponding phase;
   calculating a phase difference ($\Delta\phi 1$) of the output currents between said inverter and said AC power source from a vector product of said respective output current detected values and said respective difference value;
   calculating a magnitude difference ($\Delta i1$) of the output currents between said inverter and said AC power source from a scaler product of said respective output current detected values and said respective difference value; and
   controlling the phase and/or magnitude of output power of said inverter such that the phase difference and/or the magnitude differences of the output voltage and the output current close to zero.

8. A parallel inverter control method according to claim 7, wherein:

the output voltages and currents of said inverter and said AC power source are three-phase AV voltages and currents; and the phase and magnitude differences of the output voltages and the output currents of the inverter and the AC power source are calculated respectively on the basis of perpendicular two axes components being converted from the three-phase output voltages and the three-phase output currents.

9. A parallel inverter control method according to claim 7, wherein:

said AC power source is an inverter, for which the phase and/or the magnitude of the output current and the output voltage thereof are controlled such that the phase difference of the output current and the output voltage and phase difference and/or the magnitude difference of the output current and the output voltage close to zero.

10. A parallel inverter control apparatus comprising an inverter operating as a first AC power source, the output terminal of said inverter being connected in parallel to an output terminal of a second AC power source, and a controller for controlling the parallel operation of said inverter, wherein said controller for performing said parallel operation includes:

first detection means for detecting an instantaneous value of an output voltage from said inverter;

a first biaxial coordinates converter for converting said detected instantaneous value into an orthogonal biaxial coordinates voltage component;

a second detection means for detecting an instantaneous value of an output voltage from said second AC power source;

a second biaxial coordinates converter for converting said detected instantaneous value into an orthogonal biaxial coordinates voltage component;

a comparator for obtaining respectively the difference between said biaxial coordinates voltage components transmitted from said first and second biaxial coordinates converters, and further obtaining at least one of the phase difference and the level difference of said output voltages in accordance with said obtained difference and said biaxial coordinates voltage components transmitted from said first and second biaxial coordinates converter; and a correction means for correcting at least one of command values which control respectively said phase and said level of said output voltage from said inverter so as to make said obtained one of said phase difference and said level difference of said output voltage to be zero or a near zero value.

11. A parallel inverter control apparatus according to claim 10, wherein said second AC power source is an inverter.

12. A parallel inverter control apparatus comprising an inverter operating as a first AC power source, the output terminal of which is connected in parallel to a second AC power source, and a controller for controlling the parallel operation of said inverter, wherein said controller for performing said parallel operation includes:

a first detection means for detecting an instantaneous value of an output current from said inverter;

a first biaxial coordinates converter for converting said detected instantaneous value of said detected output current into an orthogonal biaxial coordinates voltage component;

a second detection means for detecting an instantaneous value of a total load current of said inverter and said second AC power source;

a second biaxial coordinates converter for converting said instantaneous value of said detected load current into an orthogonal biaxial coordinate current component;

a comparator for obtaining respectively the difference between a biaxial coordinates current component obtained by multiplying said biaxial coordinates component transmitted from said second biaxial coordinates converter by a load share of said inverter with respect to said second AC power source and said biaxial coordinates current component transmitted from said first biaxial coordinates converter, and further obtaining at least one of the phase difference and the level difference of said output current of said inverter and said AC power source in accordance with said obtained difference and said biaxial coordinates current components transmitted from said first and second biaxial coordinates converter; and a correction means for correcting at least one of command values which control respectively the phase and the level of said output current from said inverter so as to make said obtained one of said phase difference and said level differences of said output current to be zero to a value near zero.

13. A parallel inverter control apparatus according to claim 12, wherein said second AC power source is an inverter.

* * * * *